Nov. 9, 1948. W. F. KARSTENS 2,453,325
NONSKID TIRE CHAIN
Filed Feb. 28, 1947
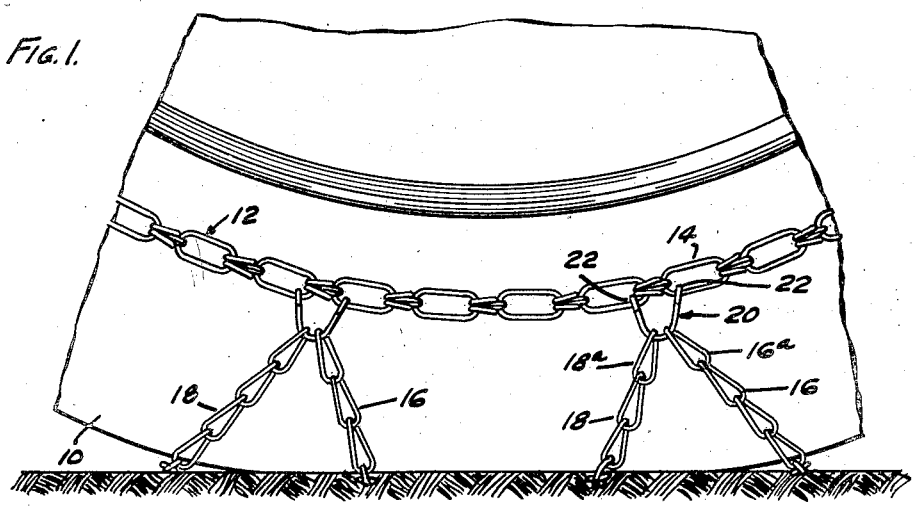
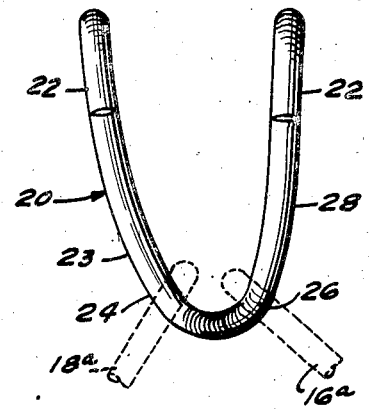
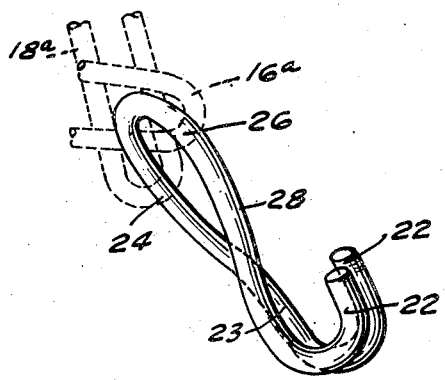
INVENTOR.
WALTER F. KARSTENS
BY
Harry N. Hitzeman
ATTORNEY.

Patented Nov. 9, 1948

2,453,325

UNITED STATES PATENT OFFICE 2,453,325

NONSKID TIRE CHAIN

Walter F. Karstens, Arlington Heights, Ill.

Application February 28, 1947, Serial No. 731,680

6 Claims. (Cl. 152—239)

My invention relates to improvements in automobile tire chains and, more particularly, to nonskid tire chains of the type that are used on wet, icy, and snow-covered highways or wherever traction is insufficient to enable the wheels of a vehicle to properly propel the same.

I have found by experiment and test that, with ordinary non-skid chains that fit directly across the surface of the tire between two circumferential links or chains, very little traction is obtained, the cross-chains having a tendency to slip with the tire, and also tending to tear into and rip the tread from the tire, with the result that very little, if any, helpful results are accomplished by using the same.

I have also found by experiment and test that by extending the cross-chains or traction chains at a diagonal or in a zig-zag manner across the surface of the tire, that the effort of traction secured thereby is considerably increased over the straight cross-chains previously mentioned. However, in usuing the diagonal chains, the design and construction of the connector or pivot link, which connects the same to the circumferential chains, must be such that the diagonal traction chains may rotate back and forth through considerable of an arc, and when this is not possible, the traction chains have the same tendency to dig into the tread of the tire and tear and ruin the same.

The provision of a connection to the circumferential chains, so that the traction chain is free to rotate to a degree, may be accomplished in a number of ways. A bolt that fits into a socket, for example, so that it can rotate, may be connected to each of the end links of each of the diagonal traction chains; the end links of each of the traction chains may be fitted into a special bracket so that the traction chain is free to rotate through a considerable arc. However, both of the ways mentioned above require special units which of necessity would be fairly expensive and require skilled workmen to apply or remove.

Since it is well known that the traction links of non-skid tire chains frequently break in use on the highways and removed from garages or other repair stations, it is impractical for the operator of the car to repair or replace the chain that is constructed in the manner above described.

The principal object of the present invention is to provide a pivot member or connector capable of the functions above described, which may be in the nature of a link member formed of comparatively strong spring wire deformed or shaped in such manner that the diagonally connected traction links are capable of limited amount of arcuate movement about the same.

A further object of the invention is to provide a pivot link of the type described, which is capable of easy and simple attachment both to the diagonal traction links and to the circumferential chains which encircle the tire.

A further object of the invention is to provide a pivot link of the type described that is comparatively easy to manufacture and which, due to its particular shape, provides the necessary pivotal action for the traction chains and, as a result, is capable of long and hard usage without becoming broke, and by the use of which the traction chains are capable of longer and harder use without becoming broken.

Other objects and advantages will be more apparent from the following description wherein reference is had to the accompanying drawings, upon which Fig. 1 is a fragmentary elevational view of an automobile tire, showing my improved non-skid tire chains and pivot links applied thereto;

Fig. 2 is a full size plan view of a pivot link, constructed in accordance with my invention, with the end links of the diagonally directed traction chains shown in dotted lines connected thereto;

Fig. 3 is a front view of the same, and

Fig. 4 is a perspective view thereof.

In the embodiment of the invention which I have chosen to illustrate the same, in the drawings I have shown the usual automobile tire 10 to which the anti-skid chain 12 may be applied. The chain may be provided with the usual pair of circumferential chain members 14 and the diagonally directed or zig-zag traction chains 16 and 18. The chains 16 and 18 are connected by their end links 16a and 18a to a generally U-shaped pivot link 20, the link being provided with the usual eye members 22 by which the pivot link is connected to the circumferential chains 14.

The pivot link 20 which forms the subject matter of this invention is generally U-shaped, as previously described, the leg 23 thereof being bent generally downwardly at 24 (see Fig. 3) with the end thereof being directed upwardly at 26 and then downwardly again at 28 so that at the points 24 and 26 thereof, these being the points where the end links 18a and 16a of the traction chains connect, the portion of the pivot link is in such position that the links 16a and 18a will be in a direct line of strain from these points and also in such position that considerable rotary movement of the end of the traction links is possible without frictionally bearing against any portion of the pivot link to tend to distort the same out of shape or to prevent the traction link from rotating to a degree.

In this manner as the tire moves forward on the road the traction links are free to rotate to a degree to correspond to the movement of the tire, and instead of being held against movement and thereby rubbing against the tread of the tire, they become in effect stationary with the surface of the tire so that a gripping action by the traction chain takes place, and the traction of the wheel as it rolls over the ground is greatly increased.

The shape of the pivot links is, therefore, of the greatest importance in the construction of non-skid chains of the type described. To illustrate this point, I have taken generally U-shaped pivot links that are completely flat and have applied diagonal traction chains thereto and have driven over snow and icy pavements. I have then taken the chains off and have found that by making the pivot links of comparatively weak and ductible material, that they have been bent by reason of the strains and the rolling action of the traction links to generally the shape shown. In constructing the pivot links as herein described, I have found it preferable to caseharden the end of the same after it has been deformed, as shown.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A connector for non-skid tire chains of the type comprising a plurality of links joined to form two circumferential tire encircling links, a second plurality of links connected to and lying between said opposed tire encircling links, said second plurality of links being arranged in oppositely directed diagonal lines between said links, said connector fastened to said diagonal links and said circumferential links, said connector having its two diagonal chain engaging portions twisted to lie at right angles to the direct line of strain of each set of diagonal links fastened thereto.

2. A connector for non-skid tire chains of the type comprising a plurality of links joined to form two circumferential tire encircling links, a second plurality of links connected to and lying between said opposed tire encircling links, said second plurality of links being arranged in oppositely directed diagonal lines between said links, said connector fastened to said diagonal links and to said circumferential links, said connector having pivotal engagement with each set of said diagonally directed links and having oppositely disposed arcuate link engaging portions.

3. A pivot link for non-skid tire chains of the type having a plurality of links joined to form two circumferential tire encircling links, a second plurality of links connected to and lying between said opposed tire encircling links, said second plurality of links being arranged in oppositely directed diagonal lines between said links, said pivot link connecting said diagonally arranged links to said circumferential links, said pivot link being generally U-shaped and having two diagonal chain engaging portions twisted to lie at right angles to the direct line of strain of each of said chains of diagonally arranged links.

4. A pivot link for non-skid tire chains of the type comprising a plurality of links joined to form two circumferential tire encircling chains, a second plurality of chains of links connected to and lying between said opposed tire encircling chains, said second plurality of chains being arranged in oppositely directed diagonal lines between said first named chains, said pivot link connecting said diagonal chains to said circumferential chains, said pivot link being generally U-shaped and having its diagonal chain engaging portions twisted to lie at right angles to the direct line of strain of each of said diagonal chains.

5. A pivot link for a non-skid tire chain for automobiles, said chain being of the type having a pair of circumferential rim chains, generally U-shaped pivot links connected at spaced intervals to said circumferential chains and traction chains connected to said pivot links in a diagonal manner, each pivot link having the end links of two traction chains connected thereto, the pivot link having its end formed into two oppositely disposed arcuately shaped portions to meet the direct strain of each of the cross-chains connected thereto.

6. A pivot link for a non-skid tire chain for automobiles, said chain being of the type having a pair of circumferential rim chains, generally U-shaped pivot links connected at space intervals to said circumferential chains and traction chains connected to said pivot links in a diagonal manner, each pivot link having the end links of two traction chains connected thereto, the pivot link having its end formed into two oppositely disposed arcuate portions to meet the direct strain of each of the cross-chains connected thereto, one of said pivot links being positioned between each set of oppositely directed diagonal traction chains.

WALTER F. KARSTENS.

REFERENCES CITED

The following references are of record in the file of this patent:

UNITED STATES PATENTS

| Number | Name | Date |
|---|---|---|
| 1,302,364 | Hartley | Apr. 29, 1919 |
| 1,515,285 | St. Pierre | Nov. 11, 1924 |
| 1,687,407 | Wagner | Oct. 9, 1928 |
| 1,834,487 | German | Dec. 1, 1931 |